(12) United States Patent
Yamamoto et al.

(10) Patent No.: US 8,050,364 B2
(45) Date of Patent: *Nov. 1, 2011

(54) DIGITAL SIGNAL RECEIVING APPARATUS

(75) Inventors: Tomohiro Yamamoto, Anjo (JP); Akira Furuhashi, Takahama (JP); Takahiro Horie, Nagoya (JP); Yuichi Murakami, Chiryu (JP); Kazunori Ono, Tokai (JP); Frederic Coutant, Grasse (FR); Tarik Aouine, Valbonne (FR)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 458 days.

This patent is subject to a terminal disclaimer.

(21) Appl. No.: 12/270,453

(22) Filed: Nov. 13, 2008

(65) Prior Publication Data

US 2009/0129520 A1    May 21, 2009

(30) Foreign Application Priority Data

Nov. 15, 2007    (EP) ..................... 07120783

(51) Int. Cl.
    *H04L 27/06*    (2006.01)

(52) U.S. Cl. ..................................... 375/343
(58) Field of Classification Search ............. 375/334, 375/343, 346, 350
See application file for complete search history.

(56) References Cited

U.S. PATENT DOCUMENTS

| 2007/0201588 A1 | 8/2007 | Loiseau et al. |
| 2009/0129523 A1* | 5/2009 | Yamamoto et al. ........... 375/350 |

FOREIGN PATENT DOCUMENTS

| FR | 2 859 336 A1 | 3/2004 |
| JP | 2001004736 A | 1/2001 |
| JP | 2005-045314 A | 2/2005 |

* cited by examiner

*Primary Examiner* — David C. Payne
*Assistant Examiner* — Leon-Viet Nguyen
(74) *Attorney, Agent, or Firm* — Sughrue Mion, PLLC

(57) ABSTRACT

A digital signal receiving apparatus includes: detection-judging portion judging a possible presence of a desired signal when a signal level of a smoothed signal is greater than a reference level; wherein said first smoothed signal and said second smoothed signal are compared in order to generate a detection signal representing a judgment of a possible presence of a desired signal, said second smoothed signal having a convergence speed slower than that of the first smoothing filter, a filter controlling portion switching an adaptive filter from an adaptive mode to a non-adaptive mode when the detection-judging portion judges the possible presence of the desired signal and switching from the non-adaptive mode to the adaptive mode when the detection-judging portion judges the absence of the desired signal; a limiting portion limiting a signal level of an auto-correlation signal to the signal level of the smoothed signal; and a demodulating portion demodulating the auto-correlation signal having the signal level limited by the limiting means so as to generate a demodulated signal, wherein the input to the demodulator is limited to the level of a smoothed signal, said smoothed signal being generated from the input of the detection judging portion.

4 Claims, 4 Drawing Sheets

DIGITAL SIGNAL RECEIVING APPARATUS

CROSS REFERENCE TO RELATED APPLICATIONS

This application is based on and claims priority under 35 U.S.C §119 to European Patent Application No. 07120783.1 filed on Nov. 15, 2007, the entire content of which is incorporated herein by reference.

FIELD OF THE INVENTION

The present invention relates to a digital signal receiving apparatus.

BACKGROUND

A known digital signal receiving apparatus is disclosed in Japanese Patent No. 2001-4736A (hereinafter, referred to as reference 1, see FIG. 4) for example. FIG. 5 is a block diagram illustrating a general configuration related to a digital signal receiving apparatus 70 disclosed in the reference 1. As illustrated therein, the digital signal receiving apparatus 70 receives a desired signal S contained with a correlated noise signal N as an ambient noise, by an antenna 71. Then, the digital signal receiving apparatus 70 down-converts the received signal to a desired frequency band at a high-frequency processing portion 72. Further, the digital signal receiving apparatus 70 generates a corresponding digital signal (S"+N") by converting the signal from analog to digital at an A/D converting portion 73 and outputs the digital signal to a noise-filtering unit 74.

In addition, the digital signal receiving apparatus 70 receives the noise signal N by means of another antenna 75. Then, the digital signal receiving apparatus 70 down-converts the received noise signal N to a desired frequency band at a high-frequency processing portion 77 of a reference noise signal-output portion 76. Further, the digital signal receiving apparatus 70 generates a reference noise signal Nr, which is correlated to the noise signal N, by converting the signal N from analog to digital at an A/D converting portion 78, and outputs the digital signal to the noise-filtering unit 74.

The noise-filtering unit 74 generates a noise cancel signal AN via an adaptive filtering-portion 79 on the basis of the reference noise signal Nr, and filters out the noise signal N by adding the digital signal (S"+N") inputted from the antenna 71 to the noise cancel signal AN at an adder 80. A filter coefficient of the adaptive filtering portion 79 is successively updated so that the noise signal N (N") is reduced to a minimum by the filter coefficient updating portion 81.

However, according to the digital signal receiving apparatus 70 of the reference 1, the antenna 75 and the reference noise signal-output portion 76 (the high-frequency processing portion 77 and the A/D converting portion 78) are required for receiving the noise signal N, thus leading to an increase of a size of a circuit. In this case, it is necessary not to input a desired signal S to the antenna 75. In other words, if the desired signal S is inputted to the second antenna 75, the desired signal S may be also generated as the noise cancel signal AN at the adaptive filtering portion 79 and the desired signal S may sometimes be filtered our or removed.

Another digital signal receiving apparatus has been proposed in Japanese Patent No. 2005-45314A (hereinafter, referred to as reference 2, see FIG. 1). The reference numerals described below related to Reference 2 are depicted in FIG. 1 of Reference 2. The digital signal receiving apparatus according to the reference 2 includes an adaptive filter (17), filter controlling means (18c) and demodulating means (18d). The adaptive filter (17) includes an adaptive mode and a non-adaptive mode. In the adaptive mode, a filter coefficient is successively updated and an ambient noise is filtered out in a signal-receiving standby state for receiving a desired signal. In the non-adaptive mode, updating of the filter coefficient is stopped in a signal-receiving state for receiving the desired signal. The filter controlling means (18c) controls switching of the adaptive mode and the non-adaptive mode of the adaptive filter (17). The demodulating means (18d) demodulates an output (correlation signal) of the adaptive filter (17) and generates a demodulated signal. The adaptive filter (17) includes an adaptive filter portion (17a, 17b) and a filter coefficient-updating portion (17c, 17d). At the adaptive filter portion (17a, 17b), the filter coefficient is changed in accordance with a change of the ambient noise in the signal-receiving standby state. The filter coefficient updating portion (17c, 17d), successively updates the filter coefficient of the adaptive filter portion (17a, 17b) so as to reduce the ambient noise to a minimum. When detecting means (18) judges a possible presence a desired signal in a situation where the apparatus is in a signal-receiving standby state, the filter controlling means switches the adaptive filter from an adaptive mode to a non-adaptive mode so as to stop updating the filter coefficient.

In such a case, in the signal-receiving standby state, the adaptive filter successively updates the filter coefficient and filters the ambient noise, reacting to the adaptive mode. On the other hand, in the signal-receiving state for receiving the desired signal, the adaptive filter stops updating the filter coefficient reacting to the non-adaptive mode. In other words, in the non-adaptive mode, the adaptive filter filters the ambient noise by use of the filter coefficient updated for filtering the ambient noise in the adaptive mode. Accordingly, in the signal-receiving state for receiving the desired signal, even when the ambient signal and the desired signal have a correlation, the ambient signal is filtered by the adaptive filter and the desired signal is received appropriately. In addition, even when the ambient signal and the desired signal have a correlation, the ambient signal and the desired signal can be selectively received because the filter controlling means controls the switching of the adaptive mode and the non-adaptive mode. Accordingly, the size of the circuit can be reduced in comparison with a configuration of the circuit in which the ambient signal and the desired signal are separately received.

However, in this type of digital signal receiving apparatus, when a level of an output (correlation signal) of the adaptive filter is rapidly changed due to a pulse-shaped interfering wave contained, a logic of a demodulated signal based upon the output may be demolished. As a result, it may not be possible to accurately judge a demodulating code for a desired signal and may not be possible to demodulate the signal precisely.

A need thus exists for providing a digital signal receiving apparatus which can demodulate a desired signal precisely even when the desired signal contains therein a pulse-shaped interfering wave.

SUMMARY OF THE INVENTION

According to an aspect of the present invention, a digital signal receiving apparatus includes: an adaptive filter receiving a signal and adapted to switch between an adaptive mode for updating successively a filter coefficient thereof and for filtering out a correlated ambient noise from the signal by use of the filter coefficient and a non-adaptive mode for discontinuing updating of the filter coefficient and for filtering out the correlated ambient noise from the signal by use of the filter coefficient updated in the adaptive mode; a signal processing portion generating an auto-correlation signal based upon the received signal from which the correlated ambient noise is filtered out by the adaptive filter; a detection-judging portion having a first smoothing filter generating a first smoothed signal by smoothing the auto-correlation signal, the detection-judging portion judging a possible presence of a desired signal in the signal when a signal level of the first smoothed signal is greater than a reference level and an absence of a desired signal in the signal when the signal level of the smoothed signal is smaller than the reference level; wherein said first smoothed signal (A1($t$)) and said second smoothed signal (A2($t$)) are compared in order to generate a detection signal representing a judgment of a possible presence of a desired signal, said second smoothed signal (A2($t$)) having a convergence speed slower than that of the first smoothing filter; a filter controlling portion switching an actual mode of the adaptive filter from the adaptive mode to the non-adaptive mode when the detection judging portion judges the possible presence of the desired signal and switching the actual mode of the adaptive filter from the non-adaptive mode to the adaptive mode when the detection-judging portion judges the absence of the desired signal; a limiting portion limiting a signal level of the auto-correlation signal to the signal level of the first smoothed signal; and a demodulating portion demodulating the auto-correlation signal having the signal level limited by the limiting means so as to generate a demodulated signal, wherein the input to the demodulator is limited to the level of a smoothed signal, said smoothed signal being generated from the input of the detection judging portion.

In this case, even in the event where a pulse-shaped interfering wave contained rapidly changes a level of a correlation signal, the changing amount of the level is limited to a level of the smoothed signal by the limiting portion. The demodulating portion demodulates the correlation signal, of which a signal level is limited as described above, and generates a demodulated signal. Therefore, the logic of the demodulated signal is not demolished by such a pulse-shaped interfering wave, thereby enabling to demodulate the desired signal more precisely.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is described herein with reference to FIGS. 1, 2, 3 and 4.

Figure 1:
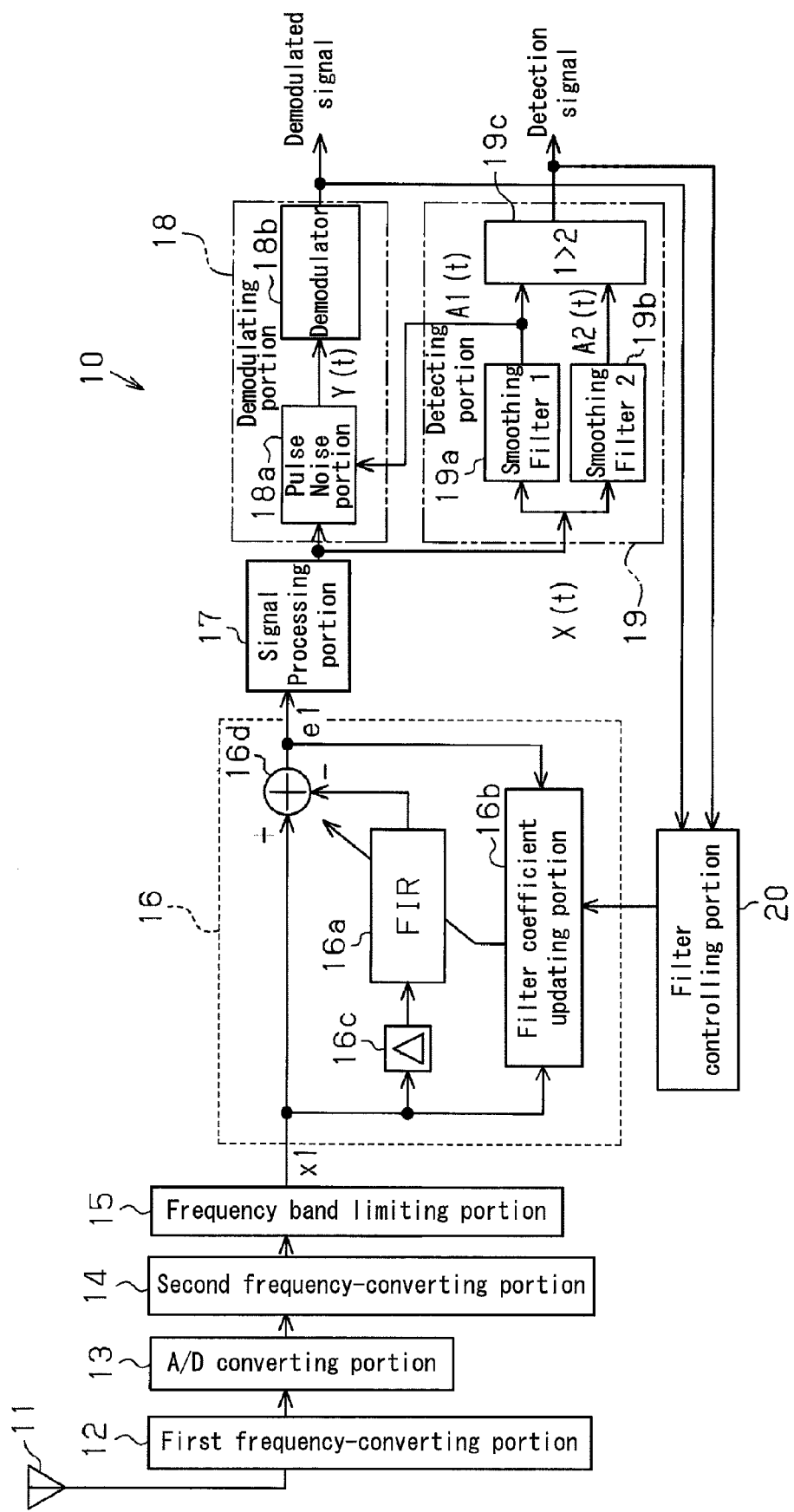
FIG. 1 is a block view illustrating a digital signal receiving apparatus according to an embodiment.

FIG. 1 is a block view illustrating a system of an FSK (Frequency shift Keying) digital signal receiving apparatus 10. The FSK digital signal receiving apparatus 10 is configured to receive a signal, for example, transmitted from a transmitter carried by a user. The signal is hereinafter referred to as a desired signal. The FSK digital signal receiving apparatus 10 is switched between operation modes, which are a signal-receiving state, in which the apparatus 10 receives the desired signal, and a signal-receiving standby state, in which the apparatus 10 is in a standby state for receiving the desired signal.

As illustrated in FIG. 1, the FSK digital signal receiving apparatus 10 incorporates therein an antenna 11, a first frequency-converting portion 12, an A/D converting portion 13, a second frequency-converting portion 14, a frequency band limiting portion 15, an adaptive noise-filtering unit 16, a signal-processing portion 17, a demodulating portion 18, a detecting portion 19, and a filter controlling portion 20.

The antenna 11 is structured basically to be inputted with a desired signal. Therefore, when the FSK digital signal receiving apparatus 10 is in the signal-receiving state, the antenna 11 is inputted with an ambient noise as well as the desired signal. However, when the FSK digital signal receiving apparatus 10 is in the signal-receiving standby state, the antenna 11 is inputted with an ambient noise.

The first frequency-converting portion 12 converts a frequency of a signal emitted from the antenna 11 and generates an intermediate-frequency signal to be outputted to the A/D converting portion 13. The A/D converting portion 13 converts the signal outputted by the first frequency-converting portion 12 from an analog form to a digital form and generates a discrete digital signal. The A/D converting portion 13 outputs the discrete digital signal to the second frequency-converting portion 14.

The second frequency-converting portion 14 converts a frequency of the discrete digital signal outputted by the A/D converting portion 13 and generates a base band signal to be outputted to the frequency-band limiting portion 15. The frequency-band limiting portion 15 limits a frequency band of the base band signal outputted by the second frequency-converting portion 14 and generates a bandlimited signal. The frequency-band limiting portion 15 further outputs the bandlimited signal as a received signal X1 to the adaptive noise-filtering unit 16, which received signal X1 may contain at least one ambient noise component as a noise signal.

The adaptive noise-filtering unit 16 is configured as an adaptive filter for reducing a correlated noise from among the ambient noise. The adaptive noise-filtering unit 16 includes an adaptive filtering portion 16$a$, of which a filter coefficient is variable and adapted in response to the change in the received signal X1, and a filter coefficient updating portion 16$b$, which successively updates the filter coefficient of the adaptive filtering portion 16$a$ so as to filter out a correlated noise from the received signal X1 when the FSK digital signal receiving apparatus 10 is in the signal-receiving standby state.

In the adaptive noise-filtering unit 16, the received signal X1 transmitted by the frequency-band limiting portion 15 may be outputted to the adaptive filtering portion 16$a$ via a delaying portion 16$c$ so as to generate a signal. The received signal X1 and the signal generated via the delaying portion 16$c$ are outputted to an error calculating portion 16$d$, so that an error signal of the received signal X1 and the signal generated via the delaying portion 16$c$ is obtained or extracted by the error calculating portion 16$d$. The error calculating portion 16$d$ outputs the error signal as an interfering-wave filtered signal e1. When the FSK digital signal receiving apparatus 10 is in a signal-receiving standby state for receiving a desired signal, the adaptive noise-filtering unit 16 outputs the interfering-wave filtered signal e1 to the filter coefficient updating portion 16$b$ in addition to the received signal X1, thereby optimizing a characteristic of the adaptive filtering portion 16$a$ (adaptive mode). The adaptive noise-filtering unit 16 outputs, to the signal-processing portion 17, a signal (interfering-wave filtered signal e1) generated by removing or filtering out a stable interfering-wave corresponding to a current operation condition, such as a correlated noise, from the received signal X1.

The signal-processing portion 17 is inputted with the interfering-wave filtered signal e1, i.e., a signal transmitted by the error calculating portion 16d of the adaptive noise-filtering unit 16, and then calculates an auto correlation of the signal. The signal-processing portion 17 then outputs a correlation signal X(t) as an auto-correlation signal to the demodulating portion 18 and the detecting portion 19.

The demodulating portion 18 generates a demodulated signal based upon the correlation signal X(t) outputted by the signal-processing portion 17 and outputs the demodulated signal to the filter controlling portion 20 and a non-illustrated external circuit.

The detecting portion 19 includes a first smoothing filter 19a, which smoothes the correlation signal X(t) of the signal-processing portion 17 and generates a smoothed signal $A1(t)$, a second smoothing filter 19b (smoothing filter 2), which smoothes the correlation signal X(t) at a convergence speed slower than that of the first smoothing filter 19a and generates a smoothed signal $A2(t)$, and a comparator 19c, which compares levels of the smoothed signals $A1(t)$ and $A2(t)$. When the level of the smoothed signal $A1(t)$ is greater than that of the smoothed signal $A2(t)$ (reference level), the comparator 19c outputs a first detection signal representing "judgment of a possible presence of a desired signal". Meanwhile, when the level of the smoothed signal $A1(t)$ is smaller than that of the smoothed signal $A2(t)$, the comparator 19c outputs a second detection signal representing "judgment of an absence of the desired signal". The detecting portion 19 outputs either the first detection signal or the second detection signal to the filter controlling portion 20 and the non-illustrated external circuit. Here, the first detection signal for "judgment of a possible presence of a desired signal" is outputted in a case where a desired signal is detected or in a case where a desired signal is possibly detected. The second detection signal for "judgment of an absence of a detection of a desired signal" is outputted in a case where a desired signal is not detected.

In the event where the interfering-wave filtered signal e1 (correlation signal X(t)) changes greatly, such as when a desired signal is received, the smoothed signal $A1(t)$ rises immediately after receiving the desired signal, corresponding to the first smoothing filter 19a having a fast convergence speed. Meanwhile, the smoothed signal $A2(t)$ rises gradually after receiving the desired signal, corresponding to the second smoothing filter 19b having a slow convergence speed. Therefore, in a case where a desired signal is received, a level of the smoothed signal $A1(t)$ turns to be greater than the level of the smoothed signal $A2(t)$ (reference level). Therefore, the comparator 19c outputs the first detection signal representing "judgment of a possible presence of a desired signal".

The following equation (1) expresses the smoothed signal $A1(t)$ outputted by the first smoothing filter 19a, $$A1(t)=A1(t-1)+\mu1\cdot\{X(t)-A1(t-1)\} \quad (1),$$

and the following equation (2) expresses the smoothed signal $A2(t)$ outputted by the second smoothing filter 19b, $$A2(t)=A2(t-1)+\mu2\cdot\{X(t)-A2(t-1)\} \quad (2),$$

here, $\mu2$ is smaller than $\mu1$. Both $\mu2$ and $\mu1$ are smoothing coefficients, When the detecting portion 19 transmits the first detection signal, which represents "judgment of a possible presence of a desired signal", to the filter controlling portion 20, the filter controlling portion 20 controls the filter coefficient updating portion 16b to discontinue updating the filter coefficient of the adaptive filtering portion 16a (non-adaptive mode). In this case, in the adaptive filtering portion 16a of the adaptive noise-filtering unit 16, the last filter coefficient determined immediately before receiving the first detection signal representing "judgment of a possible presence of a desired signal" is retained. Therefore, when the FSK digital signal receiving apparatus 10 is in a signal-receiving state for receiving a desired signal, the adaptive noise-filtering unit 16 basically outputs, to the signal-processing portion 17, the signal (interfering-wave filtered signal e1) generated by removing or filtering out a stable interfering-wave corresponding to a signal-receiving standby state, such as a correlated noise, from the received signal X1. The interfering-wave filtered signal e1 is outputted to the signal-processing portion 17.

When the filter-controlling portion 20 is not inputted with the first detection signal representing "judgment of a possible presence of a desired signal", the filter-controlling portion 20 switches a current mode of the adaptive noise-filtering unit 16 from a non-adaptive mode to an adaptive mode. Further, the filter-controlling portion 20 receives a demodulated signal from the demodulating portion 18 as well as a first or second detection signal from the comparator 19c and judges, based upon the demodulated signal and the first or second detection signal, whether a signal being received is a desired signal. Therefore, not only when the filter-controlling portion 20 is not inputted with the aforementioned first detection signal, but also when the demodulated signal is not a desired signal, the adaptive noise-filtering unit 16 is switched from the non-adaptive mode to the adaptive mode. Specifically, when the filter controlling portion 20 judges, based upon the demodulated signal, a characteristic of the signal being received and the signal is judged not to exhibit the characteristic of a desired signal, the filter controlling portion 20 switches a current mode of the adaptive noise-filtering unit 16 from the non-adaptive mode to the adaptive mode. For example, the filter controlling portion 20 judges that the signal does not exhibit the characteristic of a desired signal, when the signal exhibit a monotonic characteristic, a characteristic of an interfering wave, or the like.

As described above, the adaptive noise-filtering unit 16 is switched to the adaptive mode by the filter-controlling portion 20 when (1) the filter-controlling portion 20 does not receive a first detection signal representing "judgment of a possible presence of a desired signal" and/or (2) a signal being received is not a desired signal. In this case, in the adaptive noise-filtering unit 16, updating of the filter coefficient of the adaptive filtering portion 16a is resumed. In other words, the adaptive noise-filtering unit 16 is retained in the non-adaptive mode until the first detection signal representing "judgment of a possible presence of a desired signal" disappears in the filter-controlling portion 20 and/or until the signal being received is judged not to be a desired signal.

Described below is the demodulating portion 18 according to the embodiment of the present invention.

Figure 2:
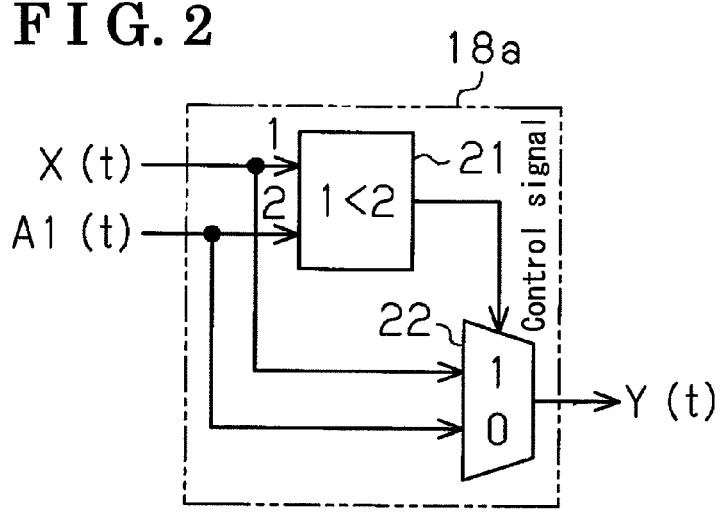
FIG. 2 is a block view illustrating a detailed structure of a pulse noise filter illustrated in FIG. 1.

As illustrated in FIG. 1, the demodulating portion 18 includes a pulse noise filter 18a and a demodulator 18b. Further, as illustrated in FIG. 2, the pulse noise filter 18a includes a comparator 21 and a selector 22.

The comparator 21 is inputted with the correlation signal X(t) and the smoothed signal $A1(t)$ and compares the levels of both signals X(t) and $A1(t)$. The comparator 21 then outputs a control signal corresponding to the comparison result to the selector 22.

The selector 22 is inputted with the correlation signal X(t), the smoothed signal A1(t) and the control signal outputted by the comparator 21. Based upon the control signal of the comparator 21, the selector 22 outputs, to the demodulator 18b, either the correlation signal X(t) or the smoothed signal A1(t), of which level is smaller than that of the other one. In this case, the signal is outputted to the demodulator 18b in the form of a pulse-noise filtered signal Y(t).

The following equation (3) expresses the pulse-noise filtered signal Y(t) outputted by the pulse noise filter 18a, $$Y(t)=\min\{X(t),A1(t)\} \quad (3).$$

As is apparent from the equation (3), the pulse noise filter 18a implements a minimization to limit the upper limit of the correlation signal X(t) to the level of the smoothed signal A1(t), thereby generating a pulse-noise filtered signal Y(t).

Figure 4:
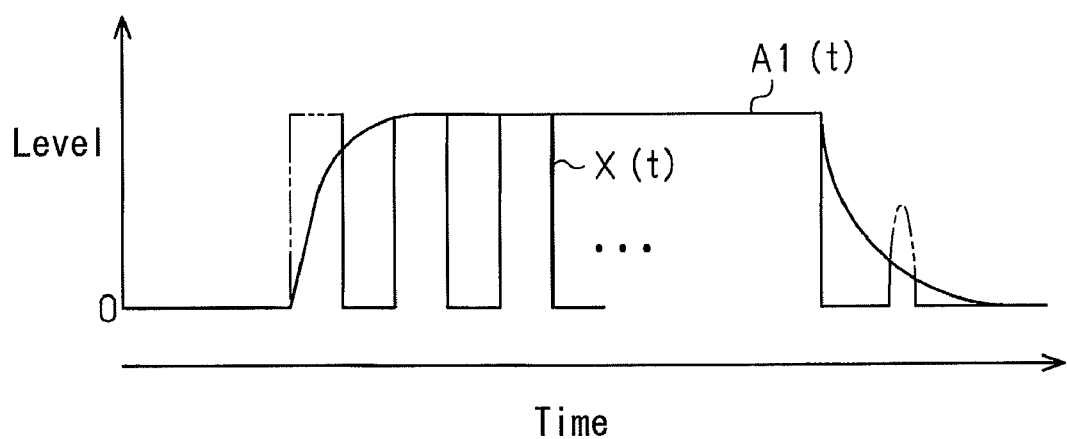
FIG. 4 is a time chart illustrating one example for explaining a transit of a correlation signal and a smoothed signal over a period of time according to the embodiment.
Figure 5:
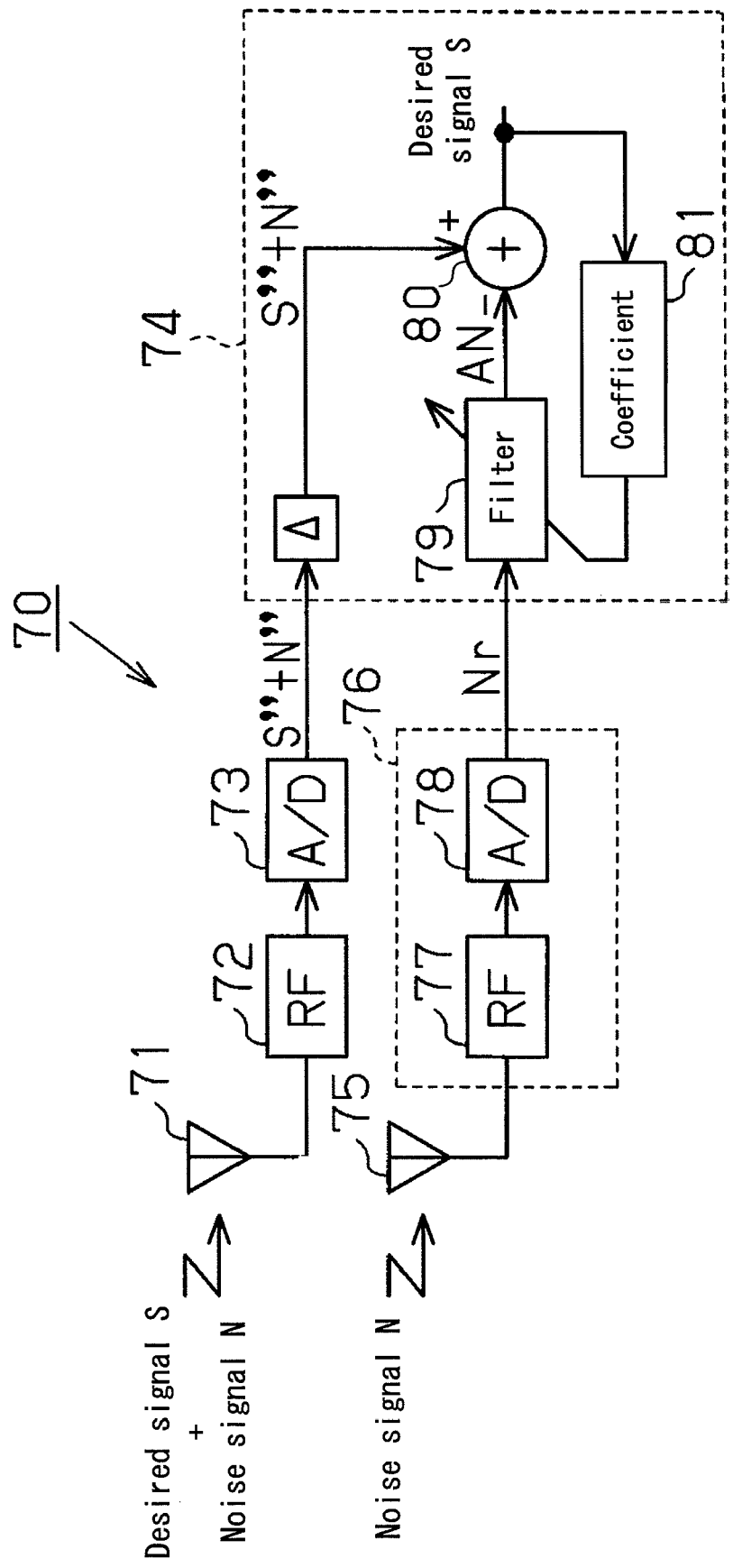
FIG. 5 is a block view illustrating a known digital signal receiving apparatus.

FIG. 4 is a time chart illustrating one example for explaining a transit of the correlation signal X(t) and the smoothed signal A1(t) over a period of time. In an event where the level of the correlation signal X(t) changes greatly such as when a desired signal is received, the smoothed signal A1(t) rises immediately after receiving the desired signal, corresponding to the first smoothing filter 19a (smoothing filter 1) having a fast convergence speed. The pulse-noise filtered signal Y(t) exhibits its level corresponding to an upper limit of the correlation signal X(t) limited to the level of the smoothed signal A1(t). The level of the smoothed signal A1(t) during receiving a desired signal is set to a level appropriate for a logical judgment of a demodulated signal. When the pulse-noise filtered signal Y(t) is outputted to the demodulator 18b, a demodulated signal is generated by the demodulator 18b, as illustrated in FIG. 1. Therefore, even when a level of the correlation signal X(t) rapidly changes in response to a pulse-shaped interfering wave contained therein, such as an impulse noise, because the upper limit of the changes in the level of the pulse-noise filtered signal Y(t) is limited to the level of the smoothed signal A1(t), the logic of the demodulated signal based upon the pulse-noise filtered signal Y(t) is prevented from being demolished due to for example a pulse-shaped interfering wave.

Figure 3:
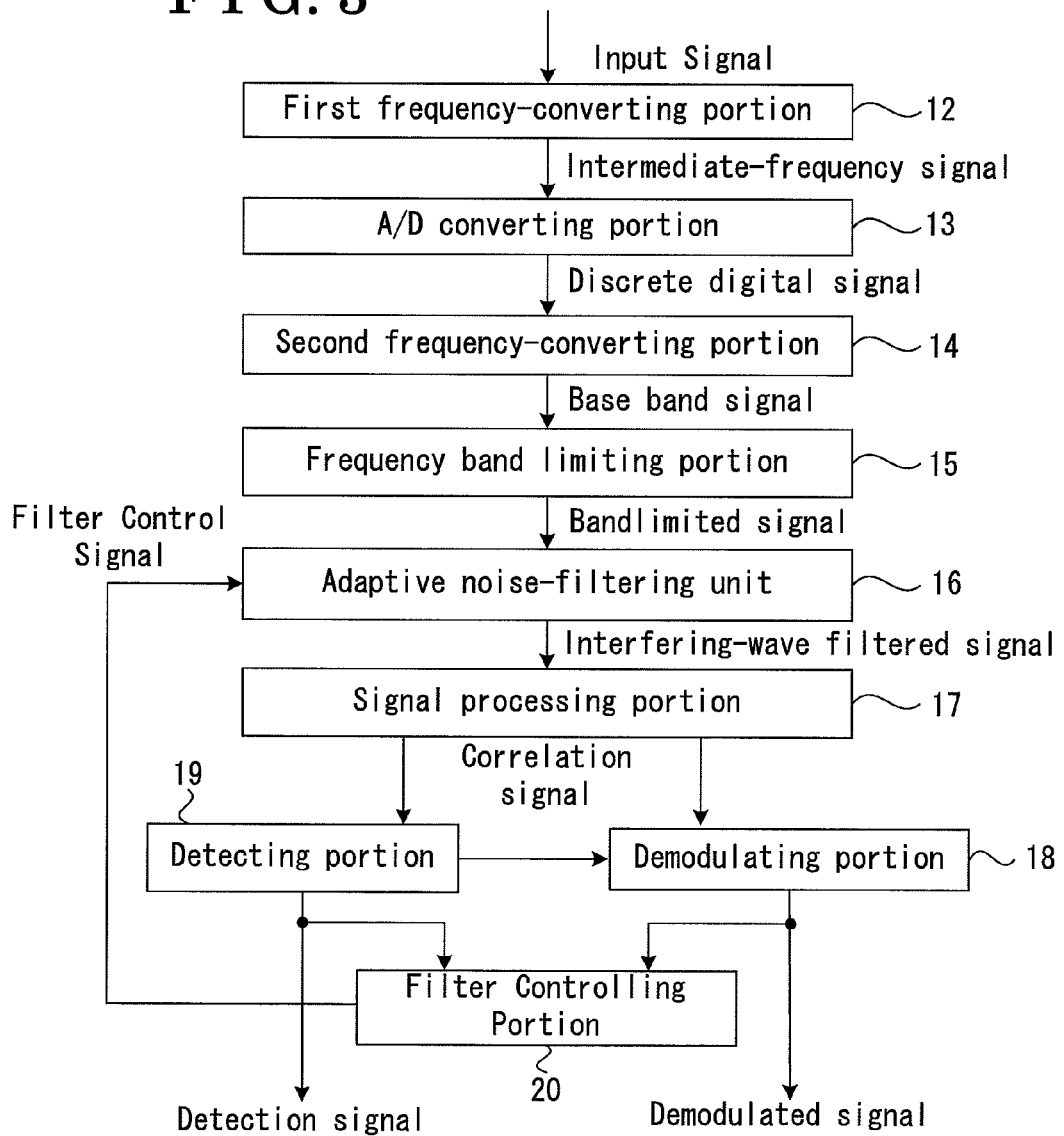
FIG. 3 is a block view for schematically explaining a signal processing according to the embodiment.

Next, an example of a signal processing according to the embodiment will be generally described below with reference to FIG. 3.

As illustrated, a signal inputted to the digital signal receiving apparatus 10 via the antenna 11 is outputted as an intermediate-frequency signal by the first frequency-converting portion 12. The intermediate-frequency signal is outputted as a discrete digital signal by the A/D converting portion 13. The discrete digital signal is outputted as a base band signal by the second frequency-converting portion 14. The base band signal is outputted as a bandlimited signal (received signal X1) by the frequency-band limiting portion 1S. The bandlimited signal is obtained or extracted as an interfering-wave filtered signal e1 by the adaptive noise-filtering unit 16 adapted to remove or filter out an interfering wave.

Secondly, the interfering-wave filtered signal e1 is outputted as a correlation signal X(t) by the signal-processing portion 17 configured to calculate an auto correlation of the interfering-wave filtered signal e1. The correlation signal X(t) is outputted as a demodulated signal by the demodulating portion 18 configured to demodulate a desired signal based upon the correlation signal. In this case, an upper limit of the correlation signal (pulse-noise filtered signal Y(t)) is limited to a level of the smoothed signal A1(t) of the detecting portion 19. Therefore, even in circumstances where a pulse shaped interfering wave is contained in the correlation signal, it is possible to prevent the logic of the demodulated signal from being demolished, as described above.

The correlation signal is outputted further as a detection signal by the detecting portion 19, which judges a possible presence of a desired signal and an absence of a desired signal, based upon the correlation signal. The demodulated signal and the detection signal are both outputted to the filter-controlling portion 20, and a filter control signal is generated by the fitter controlling portion 20 to be outputted to the adaptive noise-filtering unit 16. As described above, the adaptive noise-filtering unit 16 (adaptive filtering portion 16a) is controlled in a stable manner.

As described above, the following effects are generated according to the embodiment.

(1) Even in the event where a pulse-shaped interfering wave contained rapidly changes a level of a correlation signal (pulse-noise filtered signal Y(t)), the changing amount of the level is limited to a level of the smoothed signal A1(t) by the pulse noise filter 18a. The demodulator 18b demodulates the correlation signal (pulse-noise filtered signal Y(t)), of which a signal level is limited as described above, and generates a demodulated signal. Therefore, the logic of the demodulated signal is not demolished by such a pulse-shaped interfering wave. That is, a demodulating code for the desired signal is judged accurately, thereby enabling to demodulate the desired signal more precisely.

(2) In a case where a signal being received is not a desired signal even if "judgment of a possible presence of a desired signal" is implemented, the filter controlling portion 20 switches an actual mode of the adaptive noise-filtering unit 16 from a non-adaptive mode to an adaptive mode. Accordingly, updating of the filter coefficient by the adaptive noise-filtering unit 16 is resumed, and a signal being received, which is not a desired signal, is filtered out as ambient noise. Further, the logic of the demodulated signal is prevented from being demolished due to a pulse-waved interfering wave contained. As a result, the filter controlling portion 20 is prevented from erroneously judging a signal being received to be a desired signal, and further the adaptive noise-filtering unit 16 is prevented from being switched from the non-adaptive mode to the adaptive mode erroneously, thereby enabling to avoid the adaptive noise-filtering unit 16 from erroneously learning a desired signal as ambient noise.

(3) In a non-adaptive mode, the adaptive noise-filtering unit 16 uses a filter coefficient updated for the purpose of filtering out a correlated ambient noise during an adaptive mode and filters out ambient noise. Therefore, even when the ambient noise is correlated to a desired signal in a situation where the FSK digital signal receiving apparatus 10 is in a signal-receiving state for receiving a desired signal, the adaptive noise-filtering unit 16 filters out the ambient noise not the desired signal. As a result, it is possible to receive the desired signal appropriately. Further, even if the ambient noise is correlated to the desired signal, the adaptive noise-filtering unit 16 is enabled to selectively receive either the ambient noise or the desired signal by the filter controlling portion 20 controlling the adaptive noise-filtering unit 16 to switch between an adaptive mode and a non-adaptive mode. In this case, being compared with a case in which a circuit configured to receive an ambient noise and a desired signal selectively, the adaptive noise-filtering unit 16 can be a circuit with a reduced size. For example, it is possible to omit an antenna for receiving a noise signal and a noise signal outputting circuit, as described in reference 1.

(4) The detecting portion 19 implements "judgment of a possible presence of a desired signal", which switches the adaptive noise-filtering unit 16 from an adaptive mode to a non-adaptive mode. Therefore, it is possible for the filter controlling portion 20 to discontinue updating the filter coefficient without waiting for a judgment of a signal being received between an ambient noise and a desired signal. Therefore, the desired signal is prevented from being reflected to a filter coefficient as an ambient noise until the signal being received is identified as the desired signal. The desired signal is further prevented from being filtered out after the signal being received is identified as the desired signal. That is, until the signal being received is identified as the desired signal, the desired signal is prevented from being generated as a noise-canceling signal, thereby enabling to prevent deterioration of sensitivity in receiving a desired signal.

(5) For example, in a case of an analog signal receiver, when an interfering wave exists within a band, amplitude of a desired wave (FSK signal) needs to be greater than that of the interfering wave (noise). When the amplitude of the desired wave is smaller than that of the interfering wave, the desired wave may not be demodulated. Meanwhile, because a digital signal receiving apparatus is employed according to the embodiment, even under a circumstance where amplitude of the noise is greater than that of the FSK signal it is possible to demodulate the FSK signal.

The embodiment may be modified as described below.

According to the embodiment, the smoothed signal $A2(t)$ is employed as a reference level for the purpose of implementing "judgment of a possible presence of a desired signal". In this case, the smoothed signal $A2(t)$ can be a fixed or variable value. Alternatively, a predetermined and fixed reference level can be employed in stead of the smoothed signal $A2(t)$.

According to the embodiment, the FSK digital signal receiving apparatus 10 includes the adaptive noise-filtering unit 16. Alternatively, another adaptive noise-filtering unit may be added, which filters out a non-correlated ambient noise.

According to the embodiment, the FSK digital signal receiving apparatus 10 is employed as a digital signal receiving apparatus. Alternatively, an ASK (Amplitude Shift Keying) or PSK (Phase Shift Keying) digital signal receiving apparatus can be employed, as a non-limiting example.

The digital signal receiving apparatus mentioned above is applicable to a vehicle. In this case, the digital signal receiving apparatus may be operatively associated with a radio communication with a transmitter carried by a user, so that an electronically driven locking and unlocking of a door of the vehicle, an engine start or an engine stop is confirmed. Further, the digital signal receiving apparatus may be operatively associated with a radio communication with a transmitter carried by a user, so that actuations of electric apparatuses, such as a power window apparatus, a slide door apparatus, a sun roof apparatus are controlled. That is, the digital signal receiving apparatus can be applicable to systems in which a non-communication state (signal-receiving standby state) of a desired signal exists.

According to an aspect of the present invention, a digital signal receiving apparatus includes: an adaptive filter receiving a signal and adapted to switch between an adaptive mode for updating successively a filter coefficient thereof and for filtering out a correlated ambient noise from the signal by use of the filter coefficient and a non-adaptive mode for discontinuing updating of the filter coefficient and for filtering out the correlated ambient noise from the signal by use of the filter coefficient updated in the adaptive mode; a signal processing portion generating an auto-correlation signal based upon the received signal from which the correlated ambient noise is filtered out by the adaptive filter; a detection-judging portion having a first smoothing filter generating a first smoothed signal by smoothing the auto-correlation signal, the detection judging portion judging a possible presence of a desired signal in the signal when a signal level of the first smoothed signal is greater than a reference level and an absence of a desired signal in the signal when the signal level of the smoothed signal is smaller than the reference level wherein said first smoothed signal ($A1(t)$) and said second smoothed signal ($A2(t)$) are compared in order to generate a detection signal representing a judgment of a possible presence of a desired signal, said second smoothed signal ($A2(t)$) having a convergence speed slower than that of the first smoothing filter; a filter controlling portion switching an actual mode of the adaptive filter from the adaptive mode to the non-adaptive mode when the detection-judging portion judges the possible presence of the desired signal and switching the actual mode of the adaptive filter from the non-adaptive mode to the adaptive mode when the detection-judging portion judges the absence of the desired signal; a limiting portion limiting a signal level of the auto-correlation signal to the signal level of the first smoothed signal; and a demodulating portion demodulating the auto-correlation signal having the signal level limited by the limiting means so as to generate a demodulated signal, wherein the input to the demodulator is limited to the level of a smoothed signal, said smoothed signal being generated from the input of the detection judging portion.

In this case, even in the event where a pulse-shaped interfering wave contained rapidly changes a level of a correlation signal, the changing amount of the level is limited to a level of the smoothed signal by the limiting portion. The demodulating portion demodulates the correlation signal, of which a signal level is limited as described above, and generates a demodulated signal. Therefore, the logic of the demodulated signal is not demolished by such a pulse-shaped interfering wave, thereby enabling to demodulate the desired signal more precisely.

The filter controlling portion judges based upon the demodulated signal whether a signal currently being received is the desired signal and the filter controlling means switches the actual mode of the adaptive filter from the non-adaptive mode to the adaptive mode when the signal currently being received is not the desired signal.

In a case where a signal being received is not a desired signal even if "judgment of a possible presence of a desired signal" is implemented, the filter controlling portion switches an actual mode of the adaptive filter from a non-adaptive mode to an adaptive mode. Accordingly, updating of the filter coefficient by the adaptive filter is resumed, and a signal being received, which is not a desired signal is filtered out as ambient noise. Further, the logic of the demodulated signal is prevented from being demolished due to a pulse-waved interfering wave contained. As a result, the filter controlling portion is prevented from erroneously judging a signal being received to be a desired signal, and further the adaptive filter is prevented from being switched from the non-adaptive mode to the adaptive mode erroneously, thereby enabling to avoid the adaptive filter from erroneously learning a desired signal as ambient noise.

As described, it is possible to provide a digital signal receiving apparatus which demodulates a desired signal precisely even when a pulse-shaped interfering wave is contained.

The invention claimed is:

1. A digital signal receiving apparatus comprising:

an adaptive filter receiving a signal and adapted to switch between an adaptive mode for updating successively a filter coefficient thereof and for filtering out a correlated ambient noise from the signal by use of the filter coefficient and a non-adaptive mode for discontinuing updating of the filter coefficient and for filtering out the correlated ambient noise from the signal by use of the filter coefficient updated in the adaptive mode;

a signal processing portion generating an auto-correlation signal based upon the received signal from which the correlated ambient noise is filtered out by the adaptive filter;

a detection-judging portion having a first smoothing filter generating a first smoothed signal by smoothing the auto-correlation signal, the detection-judging portion judging a possible presence of a desired signal in the signal when a signal level of the first smoothed signal is greater than a reference level and an absence of the desired signal in the signal when the signal level of the smoothed signal is smaller than the reference level, wherein said first smoothed signal and said second smoothed signal are compared in order to generate a detection signal representing a judgment of a possible presence of a desired signal, said second smoothed signal having a convergence speed slower than that of the first smoothing filter;

a filter controlling portion switching an actual mode of the adaptive filter from the adaptive mode to the non-adaptive mode when the detection-judging portion judges the possible presence of the desired signal and switching the actual mode of the adaptive filter from the non-adaptive mode to the adaptive mode when the detection-judging portion judges the absence of the desired signal;

a limiting portion limiting a signal level of the auto-correlation signal to the signal level of the first smoothed signal; and a demodulating portion demodulating the auto-correlation signal having the signal level limited by the limiting means so as to generate a demodulated signal, wherein the input to the demodulator is limited to the level of a smoothed signal, said smoothed signal being generated from the input of the detection judging portion.

2. A digital signal receiving apparatus according to claim 1, wherein the filter controlling portion judges based upon the demodulated signal whether a signal currently being received is the desired signal, and the filter controlling portion switches the actual mode of the adaptive filter from the non-adaptive mode to the adaptive mode when the signal currently being received is not the desired signal.

3. A digital signal receiving apparatus according to claim 1, wherein the detecting portion further includes a second smoothing filter generating a second smoothed signal by smoothing the auto-correlation signal at a convergence speed slower than a convergence speed of the first smoothing filter, the second smoothed signal being employed as the reference level, and a comparator comparing the signal levels of the first and second smoothed signals and outputting a detection signal judging the possible presence of the desired signal when the signal level of the first smoothed signal is greater than the signal level of the second smoothed signal.

4. A digital signal receiving apparatus according to claim 1, wherein the reference level is a fixed value.

* * * * *